(12) United States Patent
Kozuki (10) Patent No.: US 12,107,298 B2
(45) Date of Patent: Oct. 1, 2024

(54) SECONDARY BATTERY (71) Applicant: Panasonic Corporation, Kadoma (JP)

(72) Inventor: Kiyomi Kozuki, Osaka (JP)

(73) Assignee: PANASONIC HOLDINGS CORPORATION, Kadoma (JP)

( * ) Notice: Subject to any disclaimer, the term of this patent is extended or adjusted under 35 U.S.C. 154(b) by 683 days.

(21) Appl. No.: 17/278,773

(22) PCT Filed: Sep. 5, 2019

(86) PCT No.: PCT/JP2019/034887
§ 371 (c)(1),
(2) Date: Mar. 23, 2021

(87) PCT Pub. No.: WO2020/071049
PCT Pub. Date: Apr. 9, 2020

(65) Prior Publication Data
US 2022/0037746 A1    Feb. 3, 2022

(30) Foreign Application Priority Data

Oct. 3, 2018  (JP) .................................. 2018-188299

(51) Int. Cl.
*H01M 50/533*   (2021.01)
*H01M 50/103*   (2021.01)
(Continued)

(52) U.S. Cl.
CPC ....... *H01M 50/533* (2021.01); *H01M 50/103* (2021.01); *H01M 50/183* (2021.01); *H01M 50/528* (2021.01); *H01M 50/531* (2021.01)

(58) Field of Classification Search
CPC ............. H01M 50/533; H01M 50/528; H01M 50/183; H01M 50/103
(Continued)

(56) References Cited

U.S. PATENT DOCUMENTS

2012/0009451 A1  1/2012  Yoo
2015/0236329 A1  8/2015  Okuda et al.
(Continued)

FOREIGN PATENT DOCUMENTS

JP   2003-242957 A   8/2003
JP   2018-139191 A   9/2018
(Continued)

OTHER PUBLICATIONS

International Search Report dated Dec. 3, 2019, issued in counterpart application No. PCT/JP2019/034887 (2 pages).

*Primary Examiner* — James M Erwin
(74) *Attorney, Agent, or Firm* — WHDA, LLP (57) ABSTRACT

A secondary battery has an electrode body, a sealing plate sealing an opening of a battery case, current collector tabs provided respectively on a positive and a negative electrode plate, current collector terminals disposed inside the sealing plate and connected respectively to the positive and the negative electrode plate with the respective current collector tabs interposed therebetween, and external terminals disposed outside the sealing plate and connected to the respective current collector terminals. The electrode body is accommodated in the battery case with the electrode current collector tabs being bent in a space inside the sealing plate, and each of the current collector tabs has a joined portion ultrasonically joined to the corresponding current collector terminal and a bend portion provided at a position away from the joined portion and on the electrode body side and serving as a starting portion at which the current collector tab is bent.

3 Claims, 10 Drawing Sheets

(51) Int. Cl.
  *H01M 50/183*    (2021.01)
  *H01M 50/528*    (2021.01)
  *H01M 50/531*    (2021.01)

(58) Field of Classification Search
  USPC ........................................................ 429/122
  See application file for complete search history.

(56) References Cited

U.S. PATENT DOCUMENTS

2015/0340663 A1    11/2015  Minagata et al.
2016/0141709 A1     5/2016  Kim et al.

FOREIGN PATENT DOCUMENTS

| KR | 10-2006-0027265 A | 3/2006 | |
| WO | 2014/002647 A1 | 1/2014 | |
| WO | 2014/034413 A1 | 3/2014 | |
| WO | WO-2018003843 A1 * | 1/2018 | ........... B23D 47/123 |

* cited by examiner

SECONDARY BATTERY

TECHNICAL FIELD

The present invention relates to a current collecting structure of a secondary battery.

BACKGROUND ART

In recent years, lithium ion secondary batteries have been preferably used as power supplies to be installed in vehicles or power supplies for personal computers and mobile terminals. In such lithium ion secondary batteries, a lithium ion secondary battery having a battery structure having an electrode body in which a positive electrode and a negative electrode are layered alternately with a separator interposed therebetween has been known.

For example, PTL 1 discloses a lithium ion secondary battery having a prismatic case accommodating an electrode body in which plural positive electrodes and negative electrodes and separators are layered alternately. In PTL 1, each of the positive electrodes and the negative electrodes has a protrusion (tab) constituted by a base layer (metal foil) of the electrode. Such plural tabs are layered to form tab sections, and the tab sections are joined respectively to a positive electrode current collector and a negative electrode current collector by ultrasonic joining. The positive electrode current collector and the negative electrode current collector are electrically connected to, respectively, a positive terminal and a negative terminal provided outside a lid of the prismatic case.

CITATION LIST

Patent Literature

PTL 1: Japanese Published Unexamined Patent Application No. 2018-139191

SUMMARY OF INVENTION

Regarding the lithium ion secondary battery disclosed in PTL 1, in an assembly process, the battery is assembled in a manner such that, in this order, the electrode body is placed in the prismatic case, and the opening of the prismatic case is then sealed with the lid. At this time, the assembly is performed in a manner such that, in this order, the positive electrode current collector and the negative electrode current collector are ultrasonically joined to the respective tab sections, and the prismatic case is then covered with the lid; however, stress is applied to the tab sections, the positive electrode current collector, and the negative electrode current collector during the covering with the lid. That is, when the positive electrode current collector and the negative electrode current collector are ultrasonically joined to the respective tab sections, such joining is performed in a state where stress is not applied to the electrode current collectors and the tabs; however, during the assembly, the lid is mounted in a state where the tab sections constituted by the metal foils are bent, that is, in a state where stress is applied to the tab sections.

In particular, because there has been a strong need to increase the battery capacity per unit volume in recent years, a method of increasing as much as possible the volume proportion of a positive electrode and a negative electrode in a battery case is required. Thus, a space in the battery case that members other than the positive electrode and the negative electrode can occupy has been decreased more and more. Due to such circumstances, in the above-described assembly process, the positive electrode current collector and the negative electrode current collector and the respective tab sections are accommodated in an extremely small space. As a result, such an accommodation operation is performed with large stress being applied to joined portions of the positive electrode current collector and the negative electrode current collector and the respective tab sections.

The tab sections are constituted by metal foils, thereby being bent when stress is applied thereto, whereas the positive electrode current collector and the negative electrode current collector are constituted by metal plates, thereby not being bent by the degree of stress that is applied thereto during the assembly. That is, the stress due to such bending is concentrated on the joined portions of the positive electrode current collector and the negative electrode current collector and the respective tab sections. As a result, an end portion of the joined portion of the tab section may be broken.

The present invention has been made in view of such a problem and mainly aims to provide a secondary battery having a structure with which a current collector tab can be prevented from being broken in an assembly process.

A secondary battery according to the present invention has an electrode body including a positive electrode plate and a negative electrode plate, a battery case having an opening and accommodating the electrode body, a sealing plate sealing the opening, current collector tabs provided respectively on the positive electrode plate and the negative electrode plate, current collector terminals disposed inside the sealing plate and connected respectively to the positive electrode plate and the negative electrode plate with the respective current collector tabs interposed therebetween, and external terminals disposed outside the sealing plate and connected to the respective current collector terminals. The electrode body is accommodated in the battery case with the electrode current collector tabs being bent in a space inside the sealing plate, and each of the current collector tabs has a joined portion joined to the corresponding current collector terminal and a bend portion provided at a position away from the joined portion and on the electrode body side and serving as a starting portion at which the current collector tab is bent.

According to the present invention, the current collector tabs can be prevented from being broken when the secondary battery is assembled.

DESCRIPTION OF EMBODIMENT

Hereinafter, an embodiment of the present invention will be described in detail based on the drawings. Note that the present invention is not limited to the following embodiment. In addition, modifications can be made appropriately without departing from the scope in which the advantageous effects of the present invention are exhibited.

Figure 1:
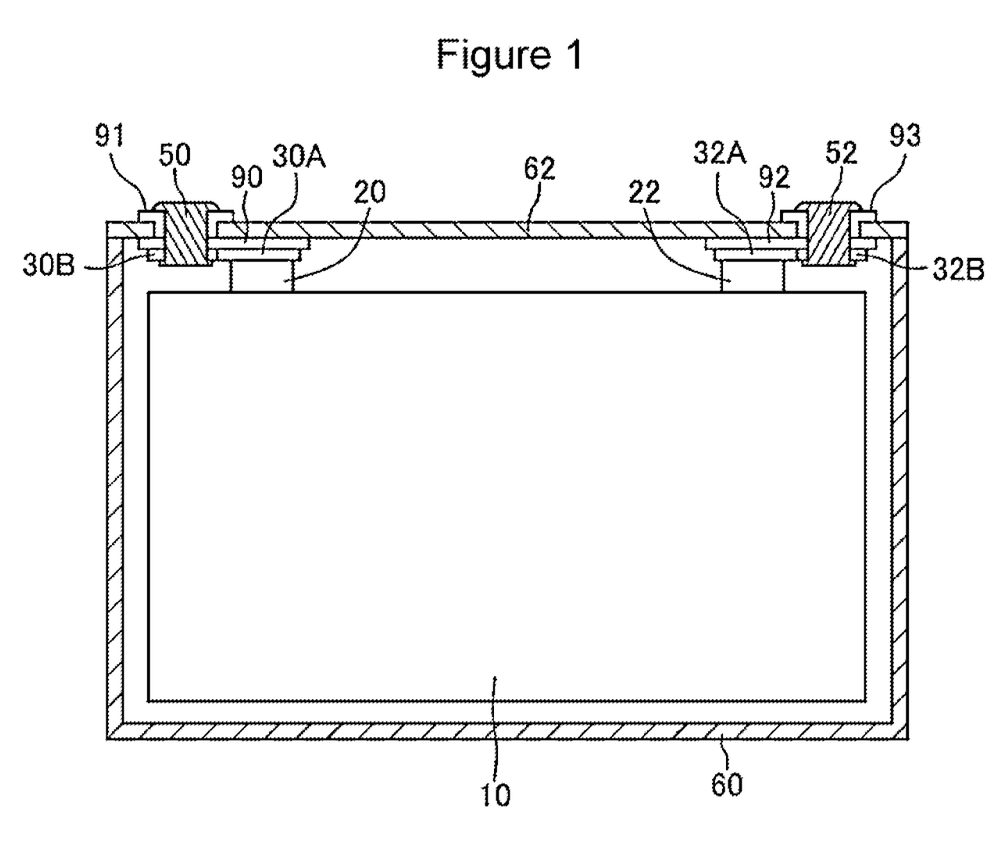
FIG. 1 is a schematic sectional view of a configuration of a secondary battery according to an embodiment of the present invention.

FIG. 1 is a schematic sectional view of a configuration of a secondary battery according to the embodiment of the present invention.

As FIG. 1 illustrates, the secondary battery according to the present embodiment has an electrode body 10 including positive electrode plates and negative electrode plates, a battery case 60 having an opening and accommodating the electrode body 10, and a sealing plate 62 sealing the opening.

Figure 2:
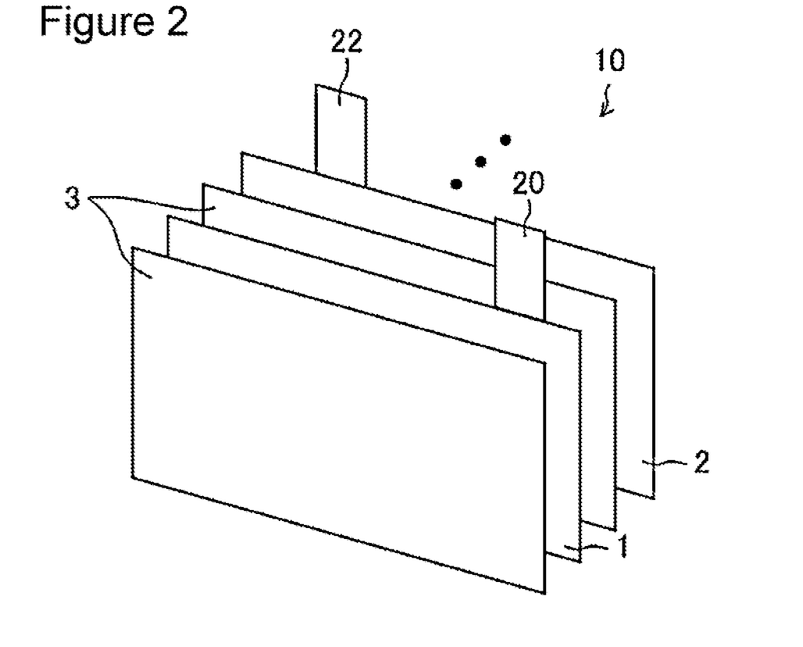
FIG. 2 is a schematic perspective view of a configuration of an electrode body.

FIG. 2 is a schematic perspective view of a configuration of the electrode body 10 according to the present embodiment.

As FIG. 2 illustrates, in the electrode body 10, plural positive electrode plates 1 and plural negative electrode plates 2 are layered with a separator 3 interposed between corresponding ones of the electrode plates. A positive electrode current collector tab 20 is provided on an end (upper end portion) of each of the positive electrode plates 1, and a negative electrode current collector tab 22 is provided on an end of each of the negative electrode plates 2. The positive electrode current collector tab 20 and the negative electrode current collector tab 22 are each constituted by a metal foil.

As FIG. 1 illustrates, in the electrode body 10, the plural positive electrode current collector tabs 20 are brought together in one place and joined to the positive electrode current collector terminal 30A, and the plural negative electrode current collector tabs 22 are brought together in one place and joined to the negative electrode current collector terminal 32A. Here, the positive electrode current collector terminal 30A and the negative electrode current collector terminal 32A are each constituted by a metal plate.

The positive electrode current collector terminal 30A is connected to a positive electrode external terminal 50, which is mounted at the outside of the sealing plate 62, with a connection member 30B interposed therebetween, and the negative electrode current collector terminal 32A is connected to a negative electrode external terminal 52, which is mounted at the outside of the sealing plate 62, with a connection member 32B interposed therebetween. Here, the connection members 30B and 32B are each constituted by a metal plate.

An insulating member 90 is disposed between the side of the positive electrode current collector terminal 30A and the connection member 30B and the side of the sealing plate 62, and an insulating member 92 is disposed between the side of the negative electrode current collector terminal 32A and the connection member 32B and the side of the sealing plate 62. The positive electrode external terminal 50 is fixed to the sealing plate 62 by caulking with a gasket 91 interposed therebetween, and the negative electrode external terminal 52 is fixed to the sealing plate 62 by caulking with a gasket 93 interposed therebetween.

Next, the joining of the positive electrode current collector tabs 20 and the positive electrode current collector terminal 30A will be described with reference to FIGS. 3 to 7. Note that the negative electrode current collector tabs 22 and the negative electrode current collector terminal 32A are also joined to one another in a similar way to the way of joining on the positive electrode side.

Figure 3:
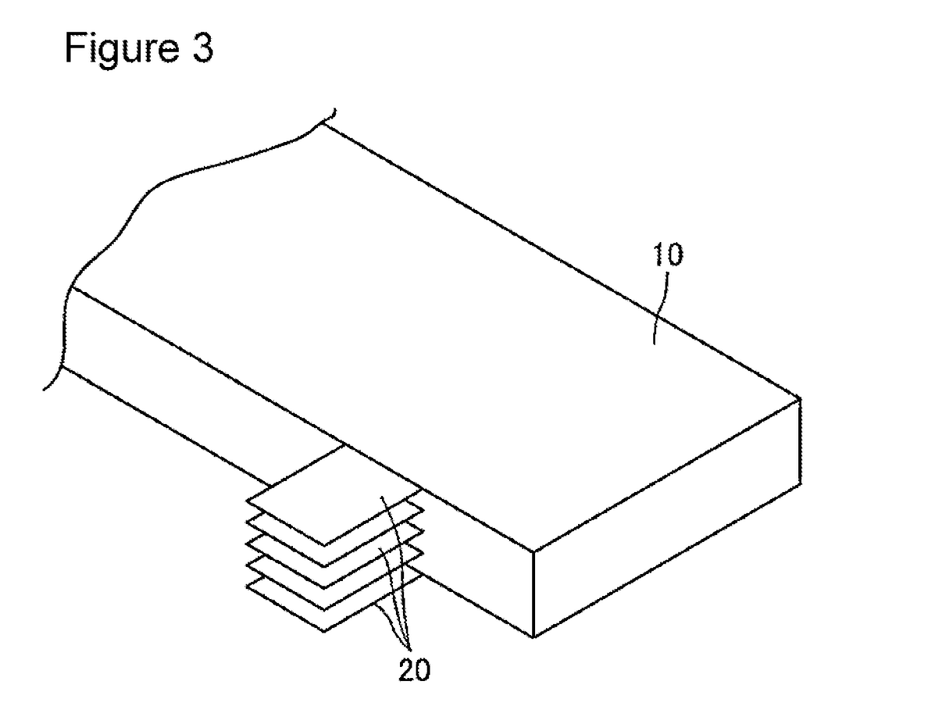
FIG. 3 is a perspective view of the electrode body illustrated in FIG. 2 and illustrates only the side on which positive electrode current collector tabs protrude.
Figure 4:
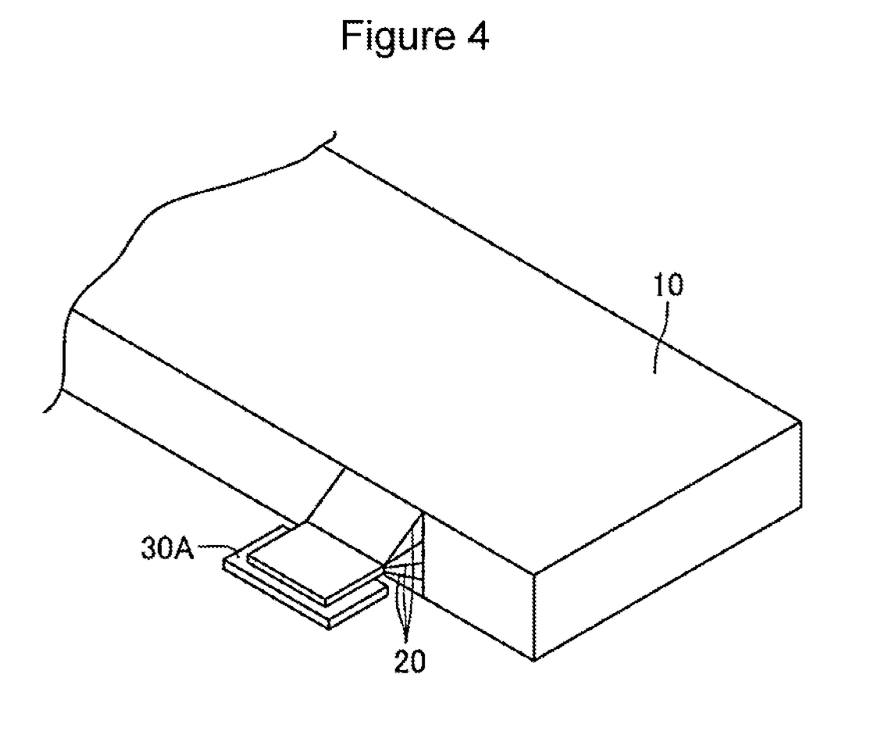
FIG. 4 is a perspective view of the positive electrode current collector tabs in a state of being layered and placed on a positive electrode current collector terminal.

FIG. 3 is a perspective view of the electrode body 10 illustrated in FIG. 2 and illustrates only the side on which the positive electrode current collector tabs 20 protrude. These plural positive electrode current collector tabs 20 are brought together in one place to be layered and are placed on the positive electrode current collector terminal 30A (FIG. 4).

Figure 5:
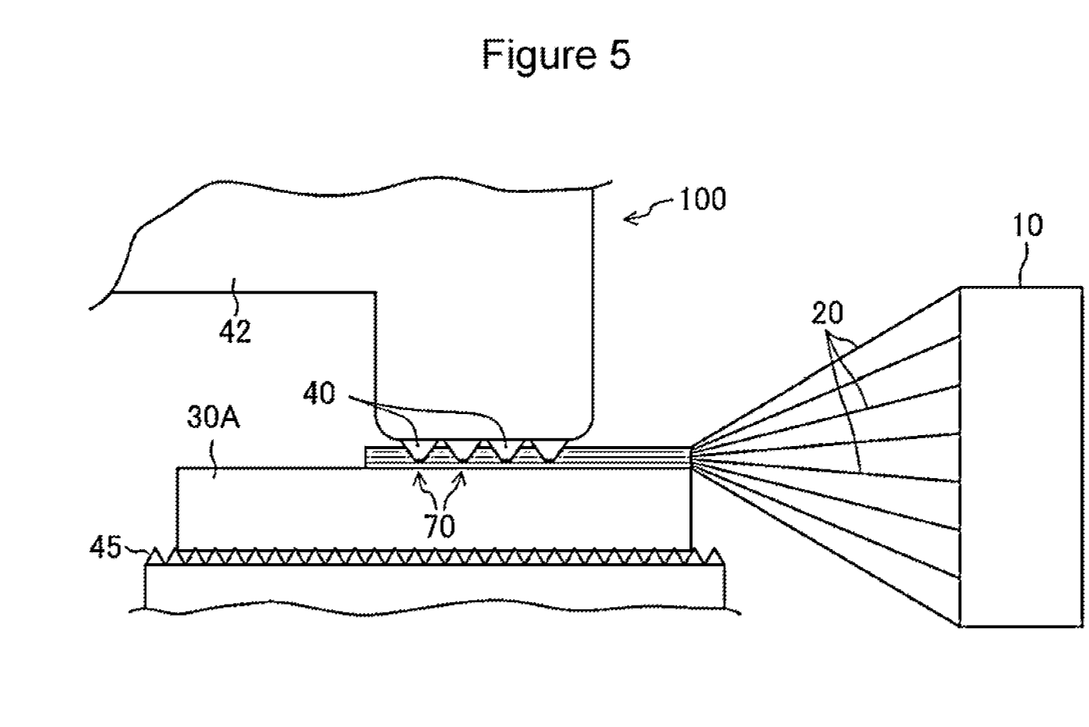
FIG. 5 illustrates a method of ultrasonically joining the positive electrode current collector tabs to the positive electrode current collector terminal.

As FIG. 5 illustrates, the positive electrode current collector tabs 20 are then joined to the positive electrode current collector terminal 30A by using an ultrasonic joining device 100. The ultrasonic joining device 100 performs ultrasonic joining by holding members to be joined between a horn 42 having plural knurls (protrusions) 40 used for the joining and an anvil 45. Specifically, the positive electrode current collector terminal 30A on which the positive electrode current collector tabs 20 are placed is placed on the anvil 45, the knurls 40 press each of the positive electrode current collector tabs 20 from the upper surface thereof, and the horn 42 moves downward while vibrating due to ultrasonic waves. Thus, the knurls 40 compresses to recess the positive electrode current collector tabs 20, and the positive electrode current collector tabs 20 and the positive electrode current collector terminal 30A are joined to one another by being heated due to frictional heat generated by ultrasonic vibration. Each of the knurls 40 is constituted by, for example, a square frustum-shaped protrusion, and a joined portion 70 of the positive electrode current collector tab 20 and the positive electrode current collector terminal 30A has a recessed shape in accordance with the shape of the knurl 40.

Figure 6:
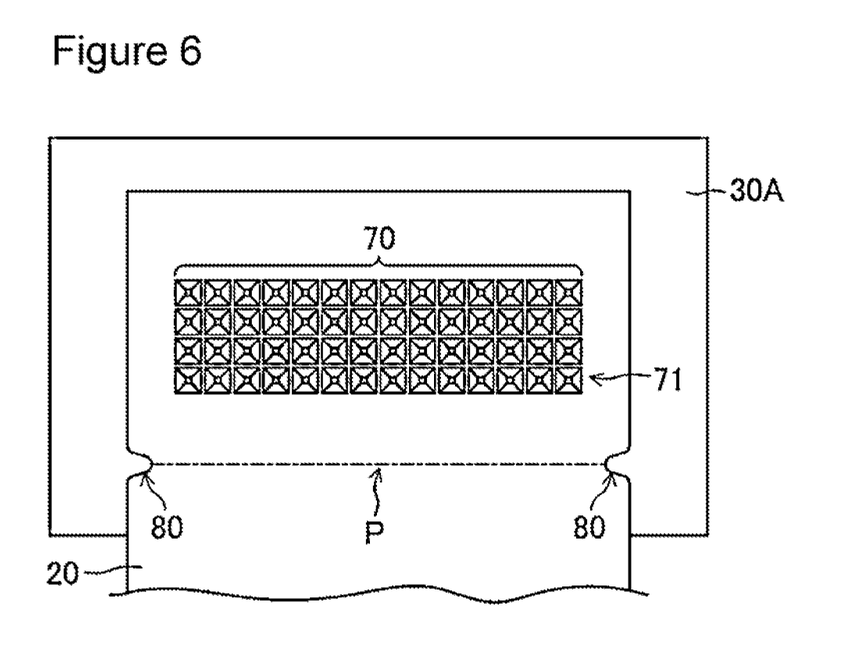
FIG. 6 is a plan view of the joined positive electrode current collector tabs and positive electrode current collector terminal as viewed from above.

FIG. 6 is a plan view of the joined positive electrode current collector tabs 20 and positive electrode current collector terminal 30A as viewed from above.

As FIG. 6 illustrates, plural ones of the joined portions 70 of the positive electrode current collector tabs 20 and the positive electrode current collector terminal 30A are aligned adjacent to one another to form a row in the width direction of the positive electrode current collector tabs 20 (a direction perpendicular to the direction in which the positive electrode current collector tabs 20 extend from the positive electrode plates 1). Plural such rows are aligned adjacent to one another in the longitudinal direction of the positive electrode current collector tabs 20 (the direction in which the positive electrode current collector tabs 20 extend from the positive electrode plates 1). Thus, the plural joined portions 70 are formed densely, thereby increasing joining strength.

In addition, each of the positive electrode current collector tabs 20 has, in end portions in the width direction, cutout portions 80, 80 at positions away from the joined portions 70 joined to the positive electrode current collector terminal 30A and on the electrode body 10 side. The cutout portions 80, 80 are a bend portion serving as a starting portion at which the positive electrode current collector tab 20 is bent in an assembly process, which will be described later.

Figure 7:
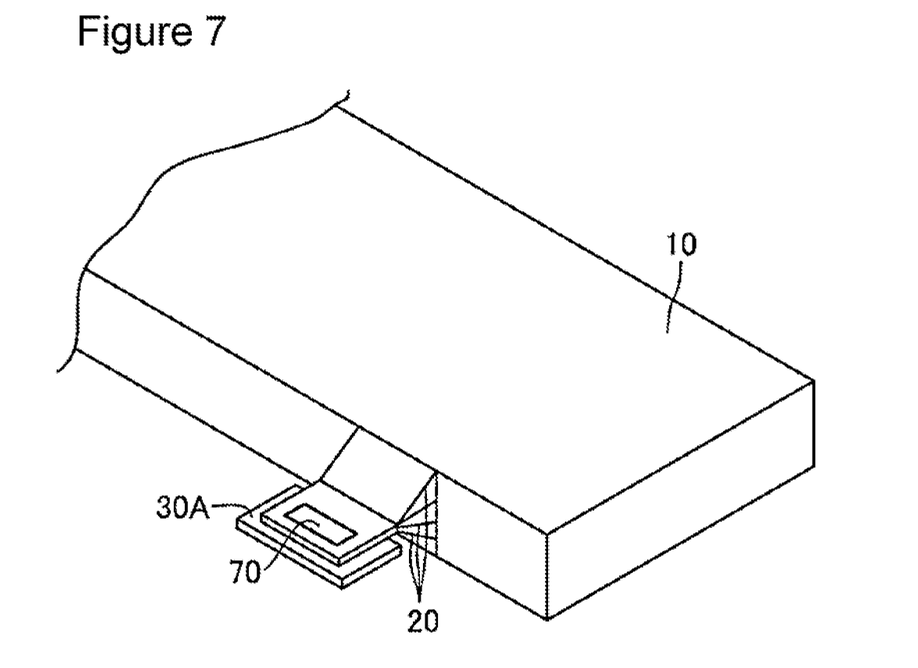
FIG. 7 is a perspective view of the joined positive electrode current collector tabs and positive electrode current collector terminal as viewed from diagonally above.

FIG. 7 is a perspective view of the joined positive electrode current collector tabs 20 and the positive electrode current collector terminal 30A as viewed from diagonally above.

Hereinafter, an assembly process subsequent to a state illustrated in FIG. 7 will be described with reference to FIGS. 8 to 11.

Figure 8:
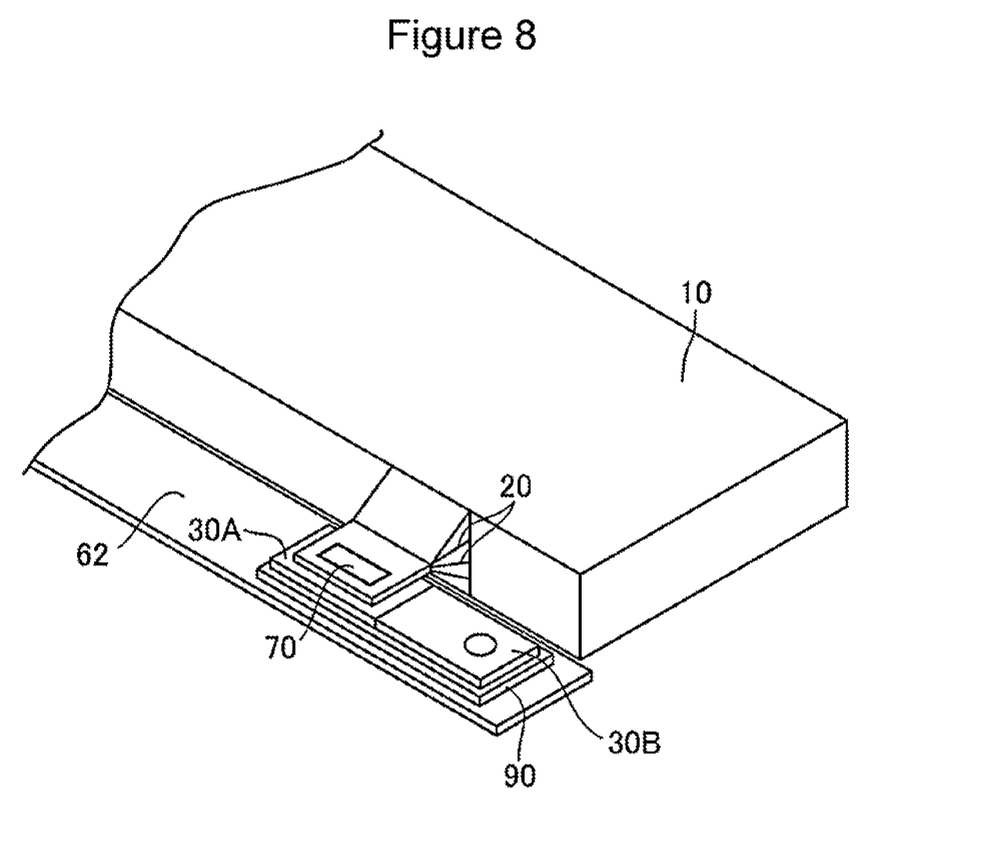
FIG. 8 is a perspective view illustrating an assembly process of the secondary battery.

As FIG. 8 illustrates, the sealing plate 62, the positive electrode external terminal 50, the insulating member 90, and the connection member 30B are connected and fixed to one another to form an integrated member in advance, and the positive electrode current collector terminal 30A to which the positive electrode current collector tabs 20 are joined is placed on the member. Regarding the positive electrode current collector terminal 30A, a surface facing away from the surface joined to the positive electrode current collector tabs 20 is on the above-described member. In addition, the positive electrode current collector terminal 30A is placed so as to be adjacent to the connection member 30B.

Figure 9:
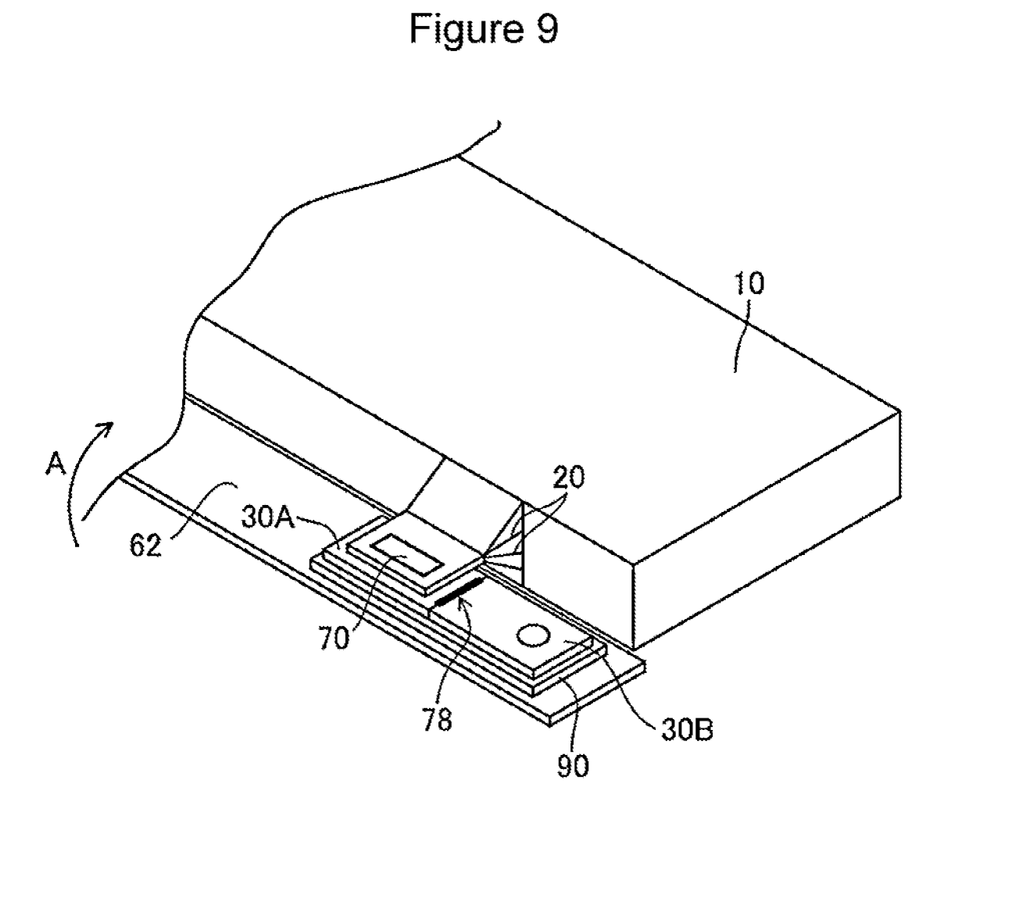
FIG. 9 is a perspective view illustrating the assembly process of the secondary battery.

Next, as FIG. 9 illustrates, an adjacent portion of the positive electrode current collector terminal 30A and an adjacent portion of the connection member 30B are welded to form a weld portion 78. The welding is performed by, for example, laser welding.

Figure 10:
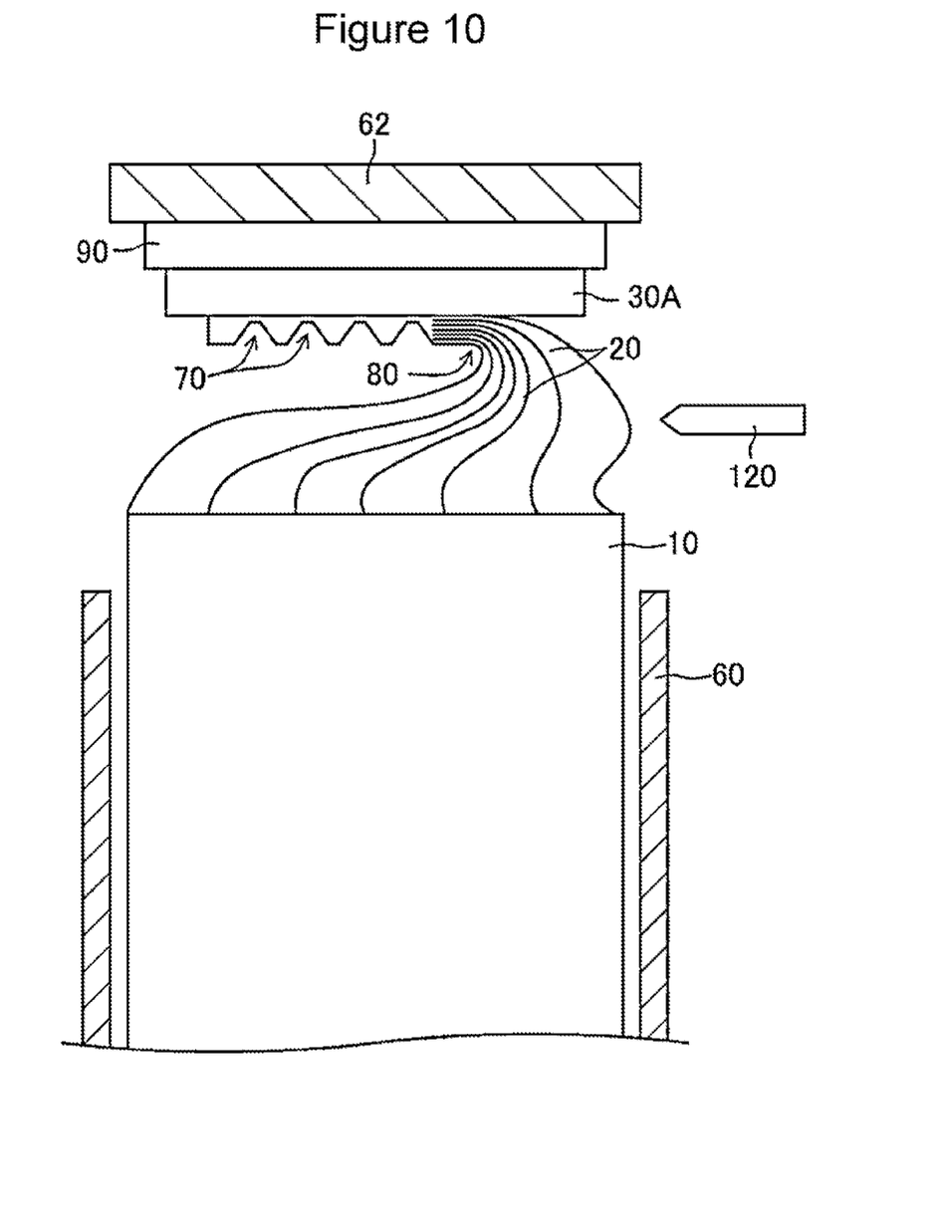
FIG. 10 is a perspective view illustrating the assembly process of the secondary battery.

Next, as FIG. 9 illustrates, the sealing plate 62 is rotated in the direction indicated by Arrow A, and, as FIG. 10 illustrates, the electrode body 10 is inserted in the battery case 60. At this time, because the positive electrode current collector tabs 20 protrude outside the battery case 60 when the sealing plate 62 is brought closer to the battery case 60, the positive electrode current collector tabs 20 are pushed by using a pushing member 120 so as to be accommodated inside the battery case 60.

Figure 11:
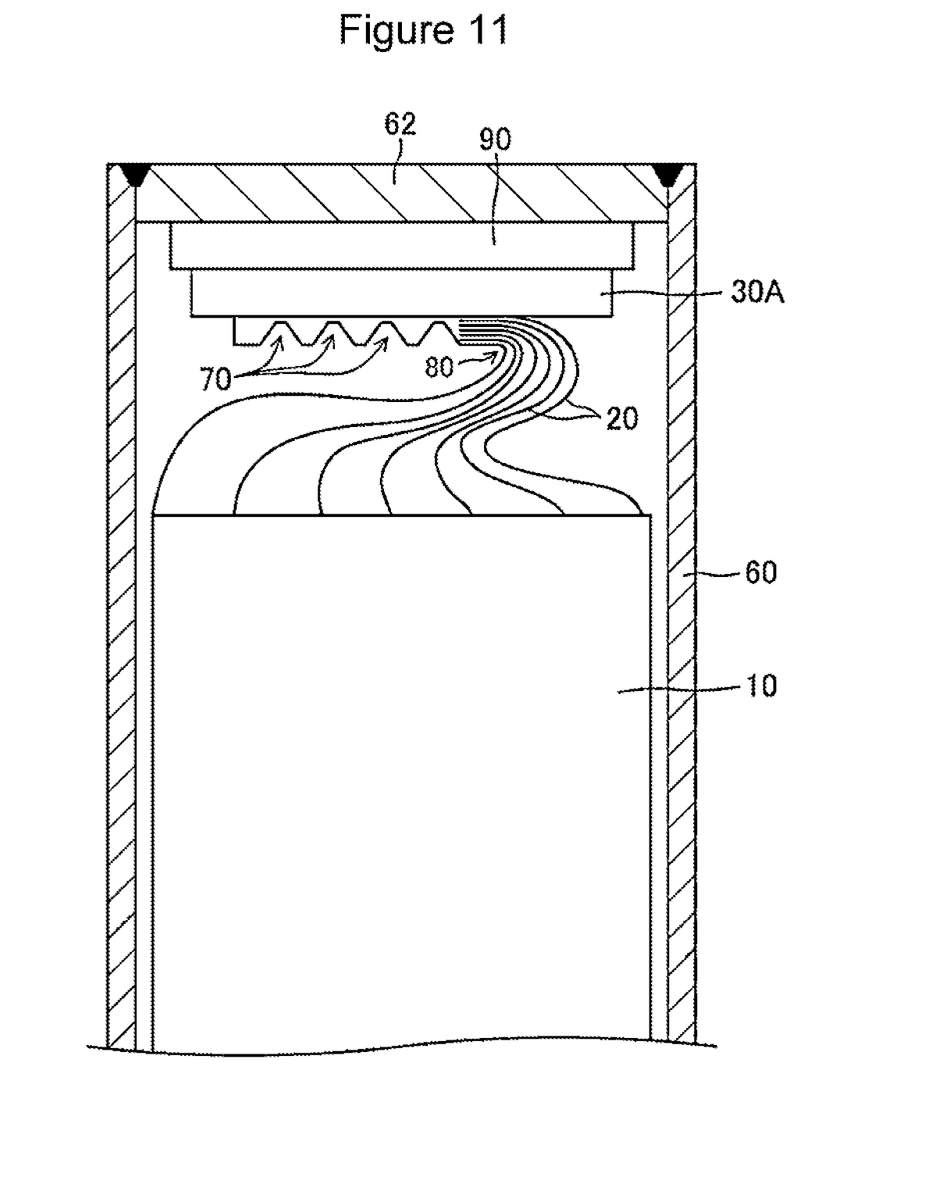
FIG. 11 is a perspective view illustrating the assembly process of the secondary battery.

Lastly, as FIG. 11 illustrates, the secondary battery according to the present embodiment is assembled by sealing the opening of the battery case 60 with the sealing plate 62 and by fixing and hermetically sealing the sealing plate 62 and the battery case 60 by welding. At this time, the electrode body 10 is accommodated in the battery case 60 with the positive electrode current collector tabs 20 being bent in the space inside the sealing plate 62.

As FIG. 5 illustrates, each of the positive electrode current collector tabs 20 has a decreased thickness at the joined portions 70 of the positive electrode current collector tab 20 and the positive electrode current collector terminal 30A, thereby having small mechanical strength thereat. Thus, when the electrode body 10 is placed in the battery case 60, in the joined portions 70 of each of the positive electrode current collector tabs 20 and the positive electrode current collector terminal 30A, joined portions 71 in the row in an end portion on the electrode body 10 side are likely to be a starting portion at which the positive electrode current collector tab 20 is bent. If the positive electrode current collector tab 20 is bent along the joined portions 71, stress is concentrated on the joined portions 71, and the positive electrode current collector tab 20 having a decreased thickness may thereby be broken.

Thus, in the present embodiment, as FIG. 6 illustrates, the positive electrode current collector tab 20 has, in end portions in the width direction, the cutout portions 80, 80 at positions away from the joined portions 70 joined to the positive electrode current collector terminal 30A and on the electrode body 10 side. The positive electrode current collector tab 20 has decreased mechanical strength at the cutout portions 80, 80, and the cutout portions 80, 80 can thereby serve as a starting portion at which the positive electrode current collector tab 20 is bent, when the electrode body 10 is placed in the battery case 60. That is, the positive electrode current collector tab 20 can be bent along Line P defined by the cutout portions 80, 80. As a result, as FIGS. 10 and 11 illustrate, the electrode body 10 can be accommodated in the battery case 60 in a state where each of the positive electrode current collector tabs 20 is bent, with the cutout portions 80, 80 as the starting portion, in the space inside the sealing plate 62.

In the present embodiment, to bend the positive electrode current collector tab 20 preferentially at the cutout portion 80 when the electrode body 10 is placed in the battery case 60, the cutout portion 80 is preferably formed so that the mechanical strength of the positive electrode current collector tab 20 at the cutout portion 80 is smaller than the mechanical strength at the joined portions 70 of the positive electrode current collector tab 20 and the positive electrode current collector terminal 30A. Note that the mechanical strength of the positive electrode current collector tab 20 at the cutout portion 80 can be adjusted by changing appropriately, for example, the shape or the size of the cutout portions 80, 80.

The cutout portion 80 is not necessarily provided in each of both end portions, in the width direction, of the positive electrode current collector tab 20 and may alternatively be provided only in one end portion. The cutout portion 80 is not necessarily provided in each of all the layered positive electrode current collector tabs 20 and may alternatively be provided only in some of the positive electrode current collector tabs 20.

Note that the mechanical strength of the positive electrode current collector tab 20 at the cutout portion 80 is not necessarily smaller than the mechanical strength at the joined portions 70 of the positive electrode current collector tab 20 and the positive electrode current collector terminal 30A. In this instance, when the electrode body 10 is placed in the battery case 60, a portion of each of the positive electrode current collector tabs 20 having the cutout portion 80 can be bent preferentially by pushing the positive electrode current collector tabs 20 into the battery case 60 while, for example, a member such as the pushing member 120 illustrated in FIG. 10 pressing the portion of each of the positive electrode current collector tabs 20 having the cutout portion 80. Once a bend occurs at the cutout portion 80, after that, the opening of the battery case 60 can be sealed with the sealing plate 62 while the cutout portion 80 maintaining the bend without being pressed by the pushing member 120. As a result, the joined portions 70 of the positive electrode current collector tab 20 and the positive electrode current collector terminal 30A can be prevented from being the bend portion of the positive electrode current collector tab 20.

According to the present embodiment, because the joined portions 70 of the positive electrode current collector tab 20 and the positive electrode current collector terminal 30A do not serve as the bend portion of the positive electrode current collector tab 20, the positive electrode current collector tab 20 and the negative electrode current collector tab 22 can be prevented from being broken even if the positive electrode current collector tab 20 and the negative electrode current collector tab 22 are bent to a large extent due to the vibration and impact generated when the battery is assembled or when the battery is in use.

(Modification)

Figure 12:
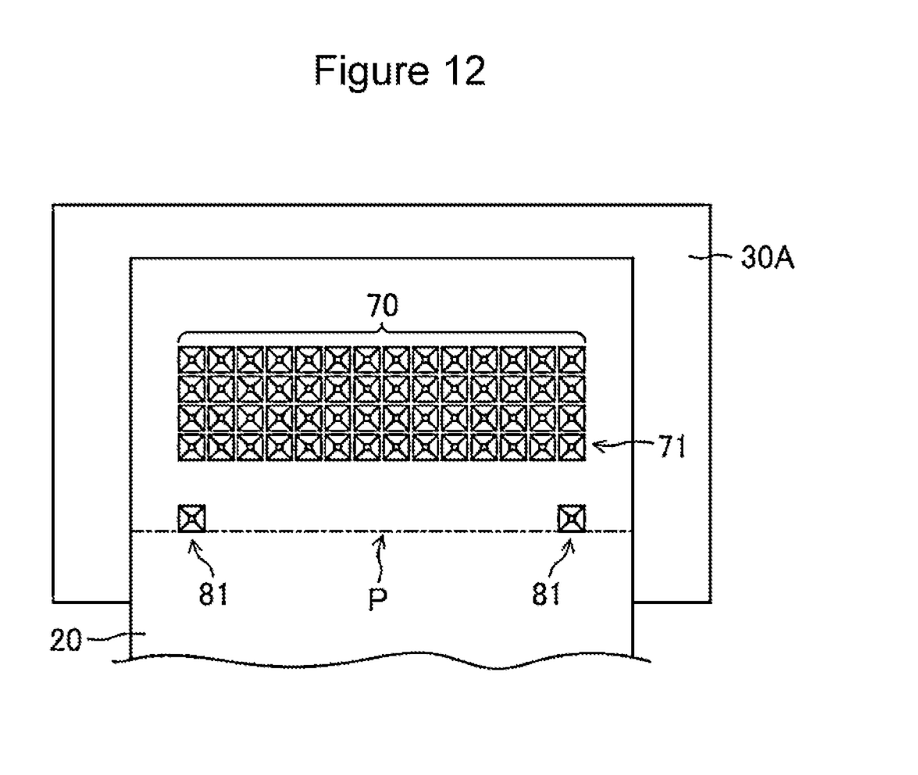
FIG. 12 is a magnified plan view of the joined portions of positive electrode current collector tabs and the positive electrode current collector terminal according to a modification of the present embodiment.

FIG. 12 is a magnified plan view of the joined portions 70 of positive electrode current collector tabs 20 and the positive electrode current collector terminal 30A according to a modification of the present embodiment.

In the above-described embodiment, the cutout portions 80, 80 are provided in the end portions of the positive electrode current collector tab 20 in the width direction so as to be the bend portion serving as the starting portion at which the positive electrode current collector tab 20 is bent. However, in the present modification, joined points 81, 81 at which each of the positive electrode current collector tabs 20 and the positive electrode current collector terminal 30A are ultrasonically welded are provided in the width direction of the positive electrode current collector tab 20 so as to be a bend portion serving as a starting portion at which the positive electrode current collector tab 20 is bent. Thus, the positive electrode current collector tab 20 can be bent along Line P defined by the joined points 81, 81. As a result, the electrode body 10 can be accommodated in the battery case 60 in a state where each of the positive electrode current collector tabs 20 is bent, with the joined points 81, 81 as the starting portion, in the space inside the sealing plate 62.

The joined points 81, 81 can be formed by using the ultrasonic joining device 100 illustrated in FIG. 5 in a similar way to the way to form the joined portion 70 according to the above-described embodiment.

In the present modification, to bend the positive electrode current collector tab 20 preferentially at the joined point 81 when the electrode body 10 is placed in the battery case 60, the joined point 81 is preferably formed so that the mechanical strength of the positive electrode current collector tab 20 at the joined point 81 is smaller than the mechanical strength at the joined portions 70 of the positive electrode current collector tab 20 and the positive electrode current collector terminal 30A. Note that the mechanical strength of the positive electrode current collector tab 20 at the joined point 81 can be adjusted by changing appropriately, for example, the size, the shape, the depth, or the number of the joined points 81.

The mechanical strength of the positive electrode current collector tab 20 at the joined point 81 is not necessarily smaller than the mechanical strength at the joined portions 70 of the positive electrode current collector tab 20 and the positive electrode current collector terminal 30A. In this instance, as in the instance where the cutout portion 80 serves as the bend portion in the above-described embodiment, when the electrode body 10 is placed in the battery case 60, a portion of each of the positive electrode current collector tabs 20 having the joined point 81 can be bent preferentially by pushing the positive electrode current collector tabs 20 into the battery case 60 while, for example, a member such as the pushing member 120 illustrated in FIG. 10 pressing the portion of each of the positive electrode current collector tabs 20 having the joined point 81.

Although the present invention has been described above with reference to the preferred embodiment, such description is not meant to be limiting, and, of course, various modifications are possible. For example, the cutout portion 80 provided in an end portion of the positive electrode current collector tab 20 in the width direction is configured to be the bend portion in the above-described embodiment; however, instead of the cutout portion 80, for example, plural through holes may alternatively be formed in the positive electrode current collector tab 20 in the width direction to be a bend portion.

In addition, in the above-described embodiment, although being constituted by different members, the positive electrode current collector terminal 30A and the connection member 30B may alternatively be formed as a single member to be a positive electrode current collector terminal.

In addition, the secondary battery according to the present invention is not limited to a particular type and is applicable to, for example, a lithium ion secondary battery, a nickel metal hydride secondary battery, and other batteries. The structure of the electrode body 10 is not also particularly limited. Known materials can be used for, for example, the positive electrode, the negative electrode, the separators, and electrolytic solution.

REFERENCE SIGNS LIST 1 positive electrode plate
2 negative electrode plate
3 separator
10 electrode body
20 positive electrode current collector tab
22 negative electrode current collector tab
30A positive electrode current collector terminal
30B connection member
32A negative electrode current collector terminal
32B connection member
50 positive electrode external terminal
52 negative electrode external terminal
60 battery case
62 sealing plate
70 joined portion
71 joined portion in row in side end portion of electrode body
80 cutout portion (bend portion)
81 joined point (bend portion)
90, 92 insulating member
91, 93 gasket
100 ultrasonic joining device

The invention claimed is:

1. A secondary battery comprising:
an electrode body including a positive electrode plate and a negative electrode plate;
a battery case having an opening and accommodating the electrode body;
a sealing plate sealing the opening;
current collector tabs provided respectively on the positive electrode plate and the negative electrode plate;
current collector terminals disposed inside of a space defined by the battery case and the sealing plate and connected respectively to the positive electrode plate and the negative electrode plate with the respective current collector tabs interposed therebetween; and
external terminals disposed outside the sealing plate and connected to the respective current collector terminals,
wherein the electrode body is accommodated in the battery case with the electrode current collector tabs being bent in a space inside the sealing plate,
wherein each of the current collector tabs form a single group and comprise:
a joined portion joined to the corresponding current collector terminal; and
a bend portion provided at a position away from the joined portion and on an electrode body side and serving as a starting portion at which the current collector tab is bent; and
the current collector tabs being bent in a direction towards the joined portion.

2. The secondary battery according to claim 1,
wherein the bend portion is constituted by a cutout portion provided in an end portion of each of the current collector tabs in a width direction of the current collector tab.

3. The secondary battery according to claim 1,
wherein the bend portion is constituted by a joined point that is joined to the corresponding current collector terminal and that is provided in the width direction of the current collector tab.

\* \* \* \* \*